United States Patent
Lollo et al.

(10) Patent No.: US 10,879,711 B2
(45) Date of Patent: Dec. 29, 2020

(54) SYSTEM AND METHOD FOR RECHARGING NOMADIC ELECTRONIC DEVICES, AND ADAPTER FOR SUCH A SYSTEM

(71) Applicant: ENERGYSQUARE SAS, Paris (FR)

(72) Inventors: Daniel Lollo, Paris (FR); Timothée Le Quesne, Versailles (FR); Gilles Rougon, Verneux les Sablons (FR); Rokhaya Kane, Dakar (SN); Matthieu Poidatz, Suresnes (FR)

(73) Assignee: ENERGYSQUARE SAS, Paris (FR)

( * ) Notice: Subject to any disclaimer, the term of this patent is extended or adjusted under 35 U.S.C. 154(b) by 266 days.

(21) Appl. No.: 15/759,361

(22) PCT Filed: Sep. 7, 2016

(86) PCT No.: PCT/FR2016/000134
§ 371 (c)(1),
(2) Date: Mar. 12, 2018

(87) PCT Pub. No.: WO2017/046458
PCT Pub. Date: Mar. 23, 2017

(65) Prior Publication Data
US 2018/0262028 A1  Sep. 13, 2018

(30) Foreign Application Priority Data
Sep. 14, 2015  (FR) .................... 15 58555

(51) Int. Cl.
*H02J 7/00*  (2006.01)
*H01R 31/06*  (2006.01)
(Continued)

(52) U.S. Cl.
CPC ............ *H02J 7/0042* (2013.01); *H01R 31/06* (2013.01); *H02J 7/0027* (2013.01); *H02J 7/025* (2013.01);
(Continued)

(58) Field of Classification Search
None
See application file for complete search history.

(56) References Cited

U.S. PATENT DOCUMENTS

| | | | | |
|---|---|---|---|---|
| 7,392,068 B2 * | 6/2008 | Dayan | ................... | H01R 13/22 439/188 |
| 7,982,436 B2 * | 7/2011 | Randall | ................. | G06F 1/1626 320/113 |

(Continued)

FOREIGN PATENT DOCUMENTS

| | | |
|---|---|---|
| CN | 103545857 A | 1/2014 |
| CN | 102084556 A | 6/2014 |
| WO | 2005/060401 A2 | 7/2005 |

OTHER PUBLICATIONS

International Search Report for PCT/FR2016/000134, dated Nov. 9, 2016.
(Continued)

*Primary Examiner* — Jared Fureman
*Assistant Examiner* — Joel Barnett
(74) *Attorney, Agent, or Firm* — Meagher Emanuel Laks Goldberg & Liao, LLP (57) ABSTRACT

Roaming electronic devices (4) are recharged on a flat recharging surface provided with wide contact zones, by using an adapter (3) which defines two electrically conductive terminals (B1, B2) of small section in an outer face (F2) of a strip of the adapter. For each device to be powered, provision is made:—to stick an inner face of the strip (B) against a face (6) of the device and engage a connector (20) in the device on the side of a bent part (21) of the strip;—to place the adapter between the device and the recharging surface to allow conduction from two of the contact zones, the terminals being spaced apart by a predetermined distance (c) very much greater than their section size; and to selectively supply contact zones with current, for these zones on (Continued)

which the two terminals bear to be in an operational state and allow the recharging via the adapter.

15 Claims, 3 Drawing Sheets

(51) Int. Cl.
    *H02J 7/02*     (2016.01)
    *H04M 1/02*     (2006.01)
    *H02J 50/10*    (2016.01)
    *H04M 19/08*    (2006.01)
(52) U.S. Cl.
    CPC .......... *H02J 50/10* (2016.02); *H04M 1/0262* (2013.01); *H04M 19/08* (2013.01)

(56) References Cited

U.S. PATENT DOCUMENTS

| | | |
|---|---|---|
| 2005/0139383 A1 | 6/2005 | Kent et al. |
| 2010/0022285 A1* | 1/2010 | Randall .............. H01R 13/2421 |
| | | 455/573 |
| 2015/0303736 A1* | 10/2015 | Eckerson .............. H02J 7/0044 |
| | | 320/108 |

OTHER PUBLICATIONS

Written Opinion for PCT/FR2016/000134, dated Nov. 9, 2016.
English Translation of First Office Action for corresponding Chinese Application No. 201680066187.2 dated Oct. 9, 2020.

* cited by examiner

SYSTEM AND METHOD FOR RECHARGING NOMADIC ELECTRONIC DEVICES, AND ADAPTER FOR SUCH A SYSTEM

FIELD OF THE INVENTION

The present invention relates to the systems that allow roaming electrical or electronic devices to be recharged. It relates in particular to a recharging system and method which are suitable for a wide variety of devices provided with standalone power supply means, in particular cellphones. The invention relates also to an adapter for equipping such devices and facilitating the recharging.

TECHNOLOGICAL BACKGROUND OF THE INVENTION

The current electrical recharging solutions are not always effective and often exhibit drawbacks. With regard to the conventional chargers generally supplied with the device to be recharged, the charging method is indeed rapid and effective. However, this type of charger is not always automatically carried around. Therefore, their use is primarily restricted to the private home.

Several other technologies address the need to recharge roaming devices, but, without a dedicated charger, a simple (and intuitive) system of use that is also compatible with a wide variety of devices is not in practice to be found.

Thus, mention can be given to the category of power bank batteries that can be connected to an electrical device to generally recharge it, usually outside of the home. These batteries have the advantage of providing a recharging device that is available everywhere but also the drawback of adding constraints for the user: in addition to having to recharge his or her phone (or other roaming device), he or she will also have to think about charging his or her power bank battery device, and constantly having it on his or her person.

There are also public recharging terminals, generally no-frills electrical socket outlets, no-frills USB sockets or apparent recharging cables available in places of transit such as airports, stations, libraries and fast food places. The aim of these installations is to provide energy to the users present in these places. These public recharging terminals have the drawback of being able to recharge only a single device per terminal, thus limiting the total number of devices that can be recharged.

Induction recharging allows mobile devices to be recharged intuitively, the user having only to place his or her device on a recharging base to recharge it, without involving a wired connection. However, induction recharging has the drawback of being able to recharge only a single device per coil, thereby making a device that is costly and difficult to use to recharge a large number of devices in a defined space. Furthermore, the effectiveness of these rechargers is not optimal because of the losses caused by the induction. It should also be noted that the practical side of this technology is greatly impacted by the fact that the user is forced to place his or her telephone at the exact point where the induction coil or coils are located. It is therefore often necessary in practice to add a mechanical retention mechanism which guides the device into position. This limits the variety of devices that can be recharged in this way.

The document U.S. Pat. No. 7,392,068 B2 (also published under the reference WO 03075415 A1) discloses an electricity distribution system which permits conduction electrical recharging while allowing a degree of freedom of movement of the device. For that, the system has a substantially flat recharging surface which has a plurality of contact zones that make it possible to adapt to a multitude of positions of the receiving input terminal placed in a face on the underside of the device.

The input terminals form part of an adapter specific to the device and which has to be configured to communicate identification information to a control unit of the electricity distribution system. It should be noted that this type of adapter is very specific and cannot cooperate with a wide variety of electrical or electronic devices. Also, the process of authentication of the adapter is complex and makes this type of solution ill-suited to places of transition. To recharge several devices of different ranges, it is also necessary to be able to modify the parameters of the current delivered by each of the contact zones, which adds an extra cost to the system.

OBJECTS OF THE INVENTION

The aim of the present invention is to mitigate one or more of the abovementioned drawbacks by proposing an electricity distribution system with great compatibility that makes it possible to recharge, in succession or simultaneously, a very wide variety of roaming electrical or electronic devices, for example latest-generation cellphones, GPS positioning devices, other similar communication devices, audio/video recording or sound and/or visual playback devices, and which requires a minimum of effort on the part of the user to obtain an effective recharge, by direct conduction.

To this end, the invention relates to an electricity distribution system for making it possible to recharge and/or power, in succession or simultaneously, roaming electrical or electronic devices (4) provided with standalone power supply means, the system comprising:

a support device which has a substantially flat recharging surface defined essentially by:
  a plurality of conductive contact zones distributed according to two directions forming adjacent rows,
  and insulation spacings between the contact zones,
a control module for selectively supplying the contact zones with current (such that the contact zones are either in an operational state, or in an inactive state); and
at least one adapter with two electrically conductive input terminals forming two surface portions spaced apart from one another by a predetermined distance and adapted to cooperate by direct conduction contact with two contact zones of the recharging surface;
the adapter comprising a strip which incorporates the two input terminals and which has:
a substantially flat outer face comprising or defining an electrically insulating coating, the two surface portions forming part of the outer face, the outer face being dimensioned and configured for the predetermined distance to be at least three times greater than the greatest extension of either one of the two surface portions;
an inner face opposite the outer face and adapted to come to be attached in against a face of a roaming electrical or electronic device; and
a bent part offset in relation to the inner face and linked electrically to the two surface portions.

By virtue of these arrangements, it is possible to simply place, on the recharging surface, a main face (for example a back face opposite a display screen when the device is a cellphone or a tablet) of a device previously equipped with the adapter. Compared to induction recharging, the system is more effective (electrical conduction) and the small size of the two input terminals of the adapter in relation to their separation allows several positionings on typically wide contact zones (unlike induction recharging, where the device has to be placed above the location of the coils).

The useful section of the input terminals can advantageously be of the same order of magnitude as the insulation spacings between two adjacent contact zones (but typically being smaller) and the predetermined distance significantly exceeds the maximum extension of a contact zone so as to avoid inadvertently forming a short-circuit.

The strip can be compatible with any device, with, if necessary, only the need for the adapter to include a specific connector member of small footprint on the side of the bent part. In practice, the strip can be simply prolonged by a universal connector member having a male micro-USB or USB (Universal Serial Bus) plug. The connecting wires or elements of such a male plug ("VBUS" and "GND") are linked to the electrically conductive wires or strips, internal to the strip, which extend to the two input terminals.

It will be noted here that the recharging port of "USB-C" type can obviously form the part in which the connector member of the adapter can be inserted. The USB-C port has been developed and officially adopted by the USB-IF (USB Implementers Forum) group which numbers more than 700 companies (including in particular Apple, Dell, HP, Intel, Microsoft and Samsung) so a wide adoption by the electronic devices market can be predicted. More generally, it can be considered that the strip has a universal nature and it is sufficient to associate it appropriately with the micro-connector (whose footprint is typically at least ten times smaller than a conventional charger) which is inserted into the port of the device to be recharged.

According to a particular feature, the inner face is at least partly adhesive and forms a flat attachment surface, such that the strip forms a sticker which extends along a longitudinal line between the bent part and a distal end. Thus, the adapter can be kept with the device (the embedded adapter having a negligible additional bulk), and, if necessary, the sticker can be unstuck when wanting to use the device without the adapter.

According to a particular feature, the strip of the adapter is fixed removably to a connector member. This allows the strip (for example in the form of a sticker) to be left stuck to the device, while freeing the recharging port of the device. More generally, it is understood that the adapter can be adapted to allow a recharging of the device by a conventional charger without it being necessary to completely detach the adapter or move the strip of the adapter.

According to a particular feature, the bent part of the strip has attachment means for removably fixing the strip to the connector member, selectively according to a first configuration or a second configuration distinct from the first configuration, such that the relative position of the strip in relation to the connector member can be modified without moving the connector member into a state connected to a device to be recharged.

According to a particular feature, the contact between the connector member and the strip (typically the bent part of the strip) can be made by magnetization, preferably with the possibility of detaching the strip by exerting a force greater than the magnetic attraction force. Small magnets can thus be placed in a constituent housing of the connector member. They attract a ferromagnetic portion of the bent part, thus creating a contact between the two parts of the adapter and a passage for the current. This type of removable fixing is advantageous in that it allows the relative position of the connector member in relation to the bent part (bend in one direction or the other, depending on the face that is to be covered by the strip, given that the micro-USB recharging sockets for example are not always oriented in the same direction on the devices) to be modified.

According to a particular feature, the system comprises a group of several adapters each provided with a corresponding strip (strip that is identical or differentiated essentially by its dimensions), such that the system is suitable for simultaneously recharging several roaming electrical or electronic devices equipped with a respective adapter of said group. It will be understood that the recharging surface, which can have a plurality of rows of contact zones, on its own allows at least two devices (for example a cellphone and a music player), each equipped with an adapter of the group of adapters, to be recharged simultaneously.

In various embodiments of the electricity distribution system according to the invention, use can possibly be made also of one or more of the following provisions:

the adapter comprises a connector member provided with an insertable removable connection part forming a first end of the connector member and a head (for example in the form of a housing) which forms a second end of the connector member opposite the insertable part;

the head of the connector member has a so-called rear end face for electrical connection with the strip and a lateral face forming a support for a fixing (for example adhesive) of the bent part;

the bent part comprises a connection surface allowing the head of the connector member to be linked electrically to the strip;

the strip is elongate and has a length at least two times greater than its greatest width (with, for example, a maximum width of between 9 and 45 mm, preferably between 10 and 35 mm);

the strip has at least two parallel fold lines, extending at right angles to a longitudinal line of elongation of the strip and allowing the connection surface to be longitudinally and radially distanced from the flat attachment surface;

the bent part of the strip comprises a fold line for defining a strip end which diverts from the rest of the strip and extends, in a recharging configuration, according to an orientation opposite the recharging surface (this end extending from the fold line to a pair of output terminals);

the output terminals form part of a substantially flat connection surface which defines, with the internal attachment face, a predetermined angle less than 120°, preferably of the order of 90°;

the adapter comprises a determined connector directly connected to the output terminals, preferably permanently, the determined connector complementing a connection port, in particular of micro-USB or USB type, to allow a roaming electrical or electronic device to be recharged (the connector member can as required correspond to the technology targeted; thus, it can correspond to the "Lightning®" technology of the Apple® brand to cooperate with the devices of this brand);

the bent part of the strip partially covers the head, preferably on the side of the second end;

the contact zones of a determined row chosen from among said rows each have a same perimeter;

the perimeter of the contact zones, at least in the determined row, is greater than a length of a set formed by three successive contact zones which belong to the determined row;

the predetermined distance has a length exceeding a quarter of said perimeter and preferably is sufficiently great for the two input terminals not to be able to be located on a same contact zone of the recharging surface;

the predetermined distance is less than half of said perimeter and can optionally be greater than 40 mm, preferably greater than or equal to 55 mm (thus, the perimeter can typically be very much greater than 80 mm, preferably greater than or equal to 110 mm and optionally each contact zone has a form that is regular and/or without a dimension that is narrower than another; when there is a visual distinction between the insulating zones and the content zones of the recharging surface, the great size of a contact zone in relation to the strip allows the user to more easily identify which contact zones are actually used for a recharge and which contact zones remain available for another device to be recharged);

in several of the rows, the contact zones have a same substantially square or hexagonal format, with a same side, so as to each define a same surface;

the two conductive surface portions, which are preferably of the same outer form and of the same dimensions, are each smaller and of another order of magnitude than the surface defined by the contact zones (a different order of magnitude should of course be understood to mean a variation by a ratio of approximately 10 or more: for example, the surface portion may be only 0.5 $cm^2$ whereas the contact zone on which it bears may be greater than 5 $cm^2$);

the format of the contact zones is square in at least one of the rows and the predetermined distance which separates the two input terminals preferably satisfies the following relationship in relation to the side of the contact zones:

$$1.42 \leq c/a \leq 2.10$$

where a represents the side of a contact zone,
and c represents the predetermined distance;

the contact zones are arranged staggered and/or comprise at least two distinct types of format;

the predetermined distance is at least four or five times greater than the greatest extension of either one of the two surface portions;

the outer characteristic dimension of the contact zones is at least five times greater than the separation distance between two adjacent contact zones, preferably at least nine times greater than this separation distance;

the outer characteristic dimension is for example at least equal to 40 mm and the recharging surface is dimensioned to define at least four parallel rows (nonlimiting example) each having at least two contact zones in an active state of use, by virtue of which the recharging surface can cooperate simultaneously with a number of adapters at least equal to four which are separately associated with pairs of contact zones, each of these adapters supporting and transferring the recharging current to a device provided with a recharging port;

the control module comprises detection means for testing a state of use of each of the contact zones.

Also proposed is an adapter for roaming electrical or electronic devices, provided with two electrically conductive input terminals forming two surface portions spaced apart from one another by a predetermined distance and adapted to cooperate by direct conduction contact with a recharging surface, which defines said adapter of the electricity distribution system according to the invention, by comprising a strip which includes the two input terminals and which has:

a substantially flat outer face comprising or defining an electrically insulating coating, the two surface portions forming part of the outer face, the outer face being dimensioned and configured for the predetermined distance to be at least three times greater than the greatest extension of either one of the two surface portions;

an inner face opposite the outer face and adapted to come to be attached against a face of a roaming electrical or electronic device, preferably opposite a display screen; and a bent part offset in relation to the inner face and linked electrically to the two surface portions.

Such an adapter facilitates the correct positioning of the device on a wide recharging surface that can typically be used to recharge several devices simultaneously. The latest-generation telephones (smartphones) and tablets generally have to be connected to computers, and, for that, the almost unique standard is USB, which corresponds to a voltage of 5 V. Thus, all the devices of this kind are provided with an interface which corresponds to the USB standard as input (5.25 V to 4.75 V) and which lowers this voltage to correspond to that of the internal battery (generally 3 or 4 V). All these devices (whatever the brand) operate with 5 V input, such that an adapter as defined above can be suitable for the recharging, by direct current conduction, of a wide variety of electrical or electronic devices.

Obviously, the adapter can be capable if necessary of operating for a charging voltage that is different from the abovementioned values. Optionally, a DC/DC type voltage converter can be installed in the adapter. Also, for another use, the nominal voltage supplied by the recharging surface can be adapted (the contact zones can also supply different voltages depending on the device). An alternative to the USB technology that can be mentioned is the "Lightning®" technology used for the devices marketed under the Apple® brand.

By virtue of the bent part, the connection elements at the output of the strip are particularly well oriented to allow connection to the interface of the device. Furthermore, because of the attachment against the back face closest to the recharging port, there are no free wires or similar connection parts that can be inserted under the device placed on the recharging surface and which risk preventing an effective conduction to the input terminal closest to the recharging port from being obtained.

According to a particular feature, the adapter comprises a connector member with rigid head and which has an insertable removable connection part distinct from said head (typically of USB or micro-USB type, without this being limiting), the bent part being connected to the head of the connector member and having a position adjustment portion delimited between a first fold line of the strip that is proximal in relation to the connector member and a second fold line of the strip that is distal in relation to the connector member. With this type of adjustment, the output connection elements are well oriented, independently of the small variations of distance that may exist, from one device to another, between the interface situated on the edge and the face (generally a back face) on which the inner face of the strip is stuck.

Another object of the invention is to propose an electrical recharging method which combines efficiency and ease of use with a wide range of devices.

To this end, an electricity distribution method is proposed for recharging, in succession or simultaneously, several roaming electrical or electronic devices provided with stand-alone power supply means, by using a substantially flat recharging surface which has a plurality of conductive contact zones distributed according to two directions forming adjacent rows, the method comprising, for each device to be recharged, the steps of, essentially:

connecting an adapter to a recharging port of the device via a connector member with moveable connection, preferably on the side of an edge of the device, the adapter comprising a strip which extends the connector member and which is provided on an outer face of two electrically conductive input terminals forming two surface portions;

sticking and attaching, in an attachment zone, an inner face of the strip opposite the outer face against a face of the device, while keeping the connector member separated from the attachment zone and in a state of electrical link to a part of the strip which is bent;

placing the adapter between the device and the recharging surface by placing the two surface portions in direct conduction contact on distinct contact zones of the recharging surface, given that the two surface portions are spaced apart from one another by a predetermined distance at least three times greater than the greatest extension of either one of the two surface portions; and selectively supplying contact zones with current, such that the two contact zones on which the two surface portions bear are in an operational state and allow the recharging via the adapter.

According to a particular feature, each of the contact zones is powered by a same voltage lying between approximately 4 V and approximately 5.25 V, for example between 4.75 V and 5.25 V, the connector member with removable connection being, for example, of USB or micro-USB type.

Advantageously, there is no need to specifically orient the device or devices to be recharged, once the latter are equipped with the adapter. The method can be implemented in several contexts. It is thus possible to install this system in all the places where the user spends time waiting or is immobile for a certain time: transport situations (airports, stations, etc.), restaurants, universities, waiting rooms, factories, offices. It is also possible to install this system in the home.

To allow users to access the recharging surface, it is possible to separately market a certain number of adapters (with the possibility for the user of retaining the adapter which forms a typically repositionable tab).

BRIEF DESCRIPTION OF THE DRAWINGS

Other features and advantages of the invention will become apparent from the following description of several embodiments, given as nonlimiting examples, in light of the attached drawings in which.

DESCRIPTION OF EMBODIMENTS OF THE INVENTION

In the different figures, identical references indicate identical or similar elements.

Figure 1:
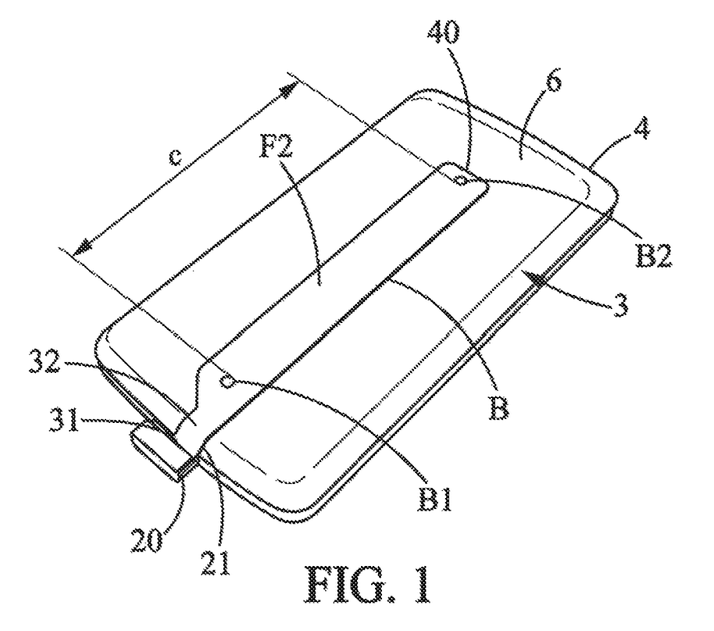
FIG. 1 is a perspective view of an adapter mounted on a device to be recharged according to an embodiment conforming to the invention.
Figure 2:
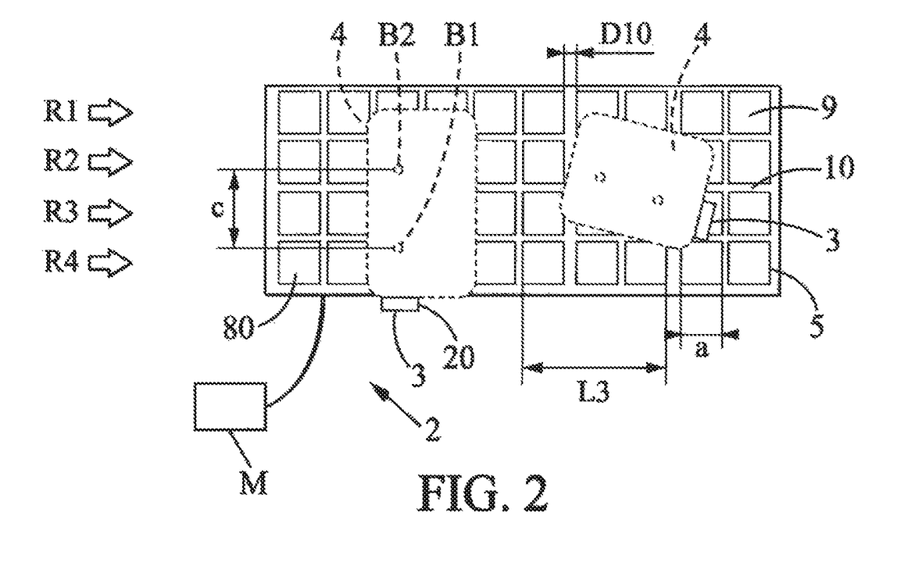
FIG. 2 schematically illustrates an electricity distribution system allowing several devices equipped with the adapter to be recharged for a variety of positions of these devices.
Figure 4:
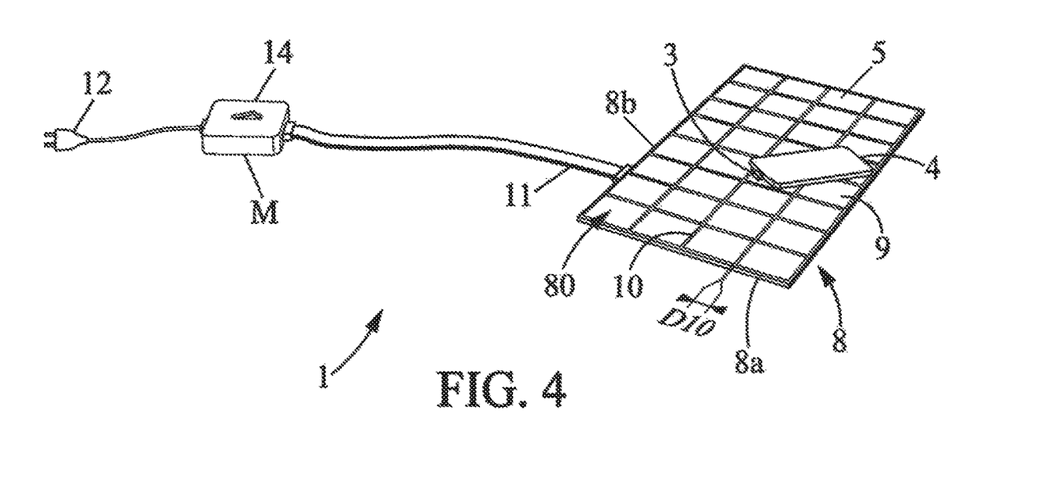
FIG. 4 is a perspective view of an electricity distribution system in operation.

Referring to FIGS. 1, 2 and 4, the electricity distribution system 1 comprises a stationary part 2 and at least one adapter 3 which is mounted on a roaming device 4 (electrical or electronic) to be recharged. There is no wired connection between the stationary part 2 and the adapter 3, nor is there any male or female part to make the electrical connection of the adapter 3 to the recharging surface 5 of the stationary part 2. The adapter 3 is simply two electrically conductive input terminals B1, B2 (for example metallic) which are situated in a substantially flat outer face F2 of a strip B.

In an assembled configuration of the adapter 3, the strip B hugs the flat relief of a back face 6 of the device 4, so as to expose the outer face F2 on the side of a main face (typically a face parallel and opposite to a display screen of the device 4). In variants, the strip B can be fixed, in addition or as a replacement, on the flanks or even on the front face (at least partly) of a device 4. It will be understood that the strip B can, optionally, partly hug a flank of a device 4 which is placed on the side of this flank against the recharging surface 5.

Stationary Part

Referring to FIGS. 2 and 4, the stationary part 2 comprises a control module M and a support device 8 which has a substantially flat recharging surface 5 adapted to supply recharging current. The control module M is configured to selectively supply current to the contact zones 9 distributed over the recharging surface 5. These contact zones 9 are electrically conductive and separated from one another by insulation spacings 10. The spacings 10 define a separation distance D10 between two adjacent contact zones 9.

The contact zones 9 are distributed according to two directions forming adjacent rows R1, R2, R3, R4. The support device 8 can take the form of a sheet which comprises an insulating substrate 8a, cutout elements 80 which are conductive and define the contact zones 9, and a wired connection 11 allowing each cutout element 80 to be linked to the control module M. In the nonlimiting example of FIGS. 2 and 4, the contact zones 9 have a form corresponding to a square or a generally square or rectangular form. It is preferable for the separation distance D10 to be reduced in relation to the side a, defined here by the contact zones 9.

The support device 8 can be cut out according to the desired form. It allows energy to be distributed over a given surface which is typically broken down into at least two rows R1, R2, R3, R4 each having at least two, three or four contact zones 9. This arrangement allows, if necessary, the recharging of several devices 4, which simultaneously have access to this energy. As can be clearly seen in FIG. 4, the energy can originate from a single electrical plug 12 linked to the control module M.

In a variant, a single row can be provided. For an application which does not target a simultaneous recharging of devices 4 on a same recharging surface 5, it will be understood that a minimum of two contact zones 9 is sufficient.

As a nonlimiting example, the insulation used in the support device 8 can be selected from among polymers (and derivatives), or wood (and derivatives), or glass (and derivatives), or other electrically insulating materials. This insulation can be rigid (and preferably unbreakable and impact-resistant) in order to give the support device 8 a certain solidity. When the insulating substrate 8a forms a sheet of a single piece, the cutout elements 80 can be inserted or embedded in the insulating substrate 8a. The cutout elements 80 have, for example, a thickness of 0.001 mm to 1 mm and form a contact zone 9 whose diagonal (or greatest equivalent extension) is typically of a size smaller than the distance c between the two input terminals B1 and B2 of the adapter. More generally, it will be understood that the contact zones 9 formed by the cutout elements 80 can have a maximum diagonal or equivalent extension that is sufficiently great to limit the density of the wired connections 11, and for example greater than or equal to 30 or 40 mm.

In a preferred embodiment, the contact zones 9 of a row R1, R2, R3 or R4 each have a same perimeter which is greater than a length L3 of a set formed by three successive contact zones 9 which belong to this same row, which shows that the distance D10 is very much less than the diagonal of a contact zone 9. The predetermined distance c exceeds a quarter of such a perimeter and, preferably, is sufficiently great for the two input terminals B1 and B2 not to be able to be located on a same contact zone 9 of the recharging surface 5.

Moreover, it can be advantageous for each contact zone 9 to have a perimeter greater than the predetermined distance and typically such that the predetermined distance c is less than half of said perimeter. In practice, for contact zones 9 of generally square or hexagonal form, and when the overall length of the strip B does not much exceed the distance c, that generally avoids having the strip B overlap more than four contact zones 9 (whereas it is sufficient for two contact zones to be covered by and in contact with the outer face F2 of the strip B to allow a recharge).

In the example illustrated, the cutout elements 80 are embedded in the insulating substrate 8a such that the "insulation+connector element" surface is even and flat (conductive cutout elements 80 arranged flush with the insulation). The material of the elements 80 can be selected from metals (and derivatives) or graphite (and derivatives). When the elements 80 form squares or hexagons, the latter are arranged on the insulating substrate 8a at regular intervals. The distance c between two adjacent contact zones 9 can be chosen as a function of a diameter DC or equivalent characteristic size of the input terminals B1 and B2 of the adapter 3. Thus, the distance D10 can be greater than the diameter DC.

The diameter DC must be less than the distance D10 if there is a desire for a surface portion PS1 or PS2 not to be able to link two different contact zones 9. In practice, preference may be given to having the distance D10 be just less than the diameter DC (or equivalent dimension) to avoid having surface portions PS1 and PS2 too often located in the middle of the insulation.

The wired connection 11 has a common sheath or a bundle of cables for the link with the control module M and has a plurality of branches which connect to each of the elements 80, preferably by a back face opposite the corresponding contact zone 9. Each electrical wire or branch (not represented) is then linked by the underside of the support device 8 to the same end 8b, then connected to the control module M, here through the sheath common to all the wires. This wired connection 11 makes it possible to convey information and electrical energy between the elements 80 and the control module M.

Figure 5:
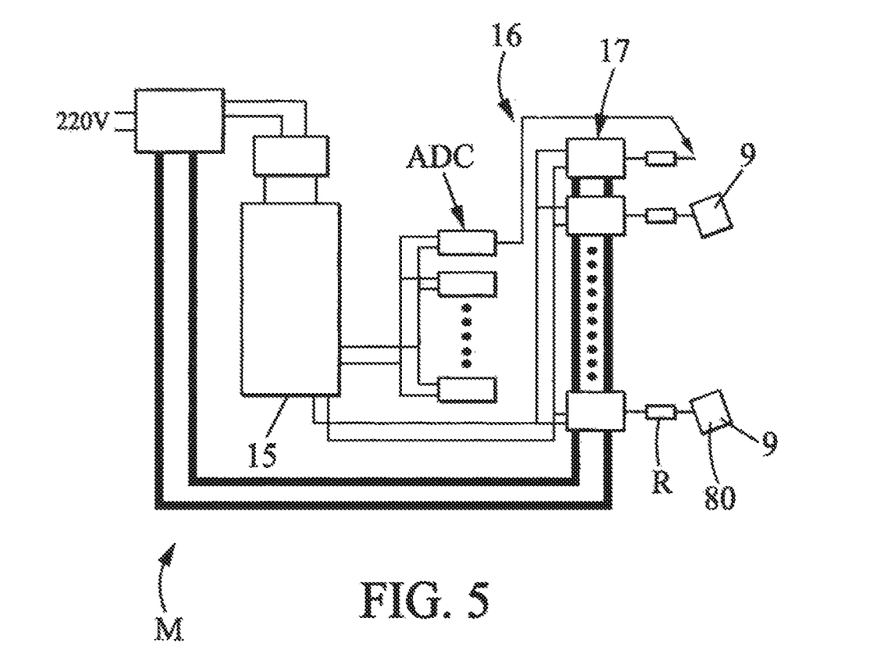
FIG. 5 is an example of an electrical diagram that can be used for selectively supplying contact zones of the recharging surface.

FIG. 5 illustrates an electrical diagram that can be used in the control module M, for example inside the housing 14 shown in FIG. 4. Among the electrical components of the control module M, there are a processing unit 15, for example in the form of a processor or a microcontroller, detection means 16 configured to selectively and periodically test the state of use of the contact zones 9 and a switching device 17.

Optionally, the switching device 17 can comprise quad half-bridges HB which each allow four elements 80 to be driven. Resistors R are optionally provided between the element 80 and the switching element or elements of the switching device 17. Thus, the processing unit 15 can independently drive each of the elements 80 and switch them from a low potential (for example 0 V) to a high potential (for example 5 V). Obviously, it is possible to use any type of switching elements, arranged between the control module M and the contact zones 9, in order to distribute current into these contact zones 9 from a same electrical power supply source linked with the control module M.

The processing unit 15 can also manage a datalink allowing it to drive ADC converters (it may be a databus with communication according to a master-slave arrangement) each used to measure the intensity output by the elements 80 then to return a signal or item of information representative of this intensity to the processing unit 15, on demand. Such ADC converters here form part of the detection means 16. Optionally, these ADC converters can be incorporated in one or more microcontrollers which form part of the processing unit 15.

It will be understood that the processing unit 15 can thus drive tester elements (for example in the form of ADC converters) distributed in parallel and each associated with one of the contact zones 9. The detection means 16 which include such tester elements can make it possible to successively determine, for the contact zones 9, a state of charge to be maintained and a state ready to charge, as a function of a response from each of the tester elements associated with a same group of contact zones 9.

In an exemplary embodiment, the processing unit 15 recovers, by virtue of the ADC converters, the intensities output by each element 80 of a same group. Here, a group is composed of a set of cutout elements 80, conductors, belonging to the support device 8 and which are sufficiently far apart for, whatever the configuration, each adapter 3 (which has the predetermined distance c between the terminals B1 and B2) not to be able to be linked to two elements 80 of the same group.

Before measuring an intensity, the processing unit 15 simultaneously switches on (switches them from 0 to 5 V for example) the elements 80 belonging to the same group during a course time period allowing the output intensity measurements to be recovered.

The processing unit 15 will then test each of the intensities obtained and deduce therefrom whether it corresponds to a resistance equivalent to that of a device 4. Thus, by a test, a deduction is made for this group as to which are the elements 80 already connected to a device 4. If such is the case, the high voltage is maintained on the corresponding element 80. Otherwise, the element 80 is returned to the low voltage.

In another version, the processing unit 15 can be configured to switch on each element 80 independently, cyclically, with a frequency that is random but greater than a constant. The tests are also done independently. Thus, in the case where two elements 80 linked to the same adapter 3 are tested at the same time, that would render the test falsenegative but the random frequency of these tests would allow an almost assured staggering of these tests on the next cycle.

More generally, the processing unit 15 can deduce, by one or more appropriate tests, whether a battery or equivalent standalone means of an electrical or electronic device 4 is indeed connected. In the case illustrated, the processing unit 15 then leaves in an operational state all the outputs of the half-bridges HB (or other elements of a switching device 17) corresponding to the elements 80 that have had a positive test, and switches off the others.

In the diagram of FIG. 5, the ADC converters measure the output intensity typically through the voltage drop at the output, but that could also be done via Hall effect sensors. It will be understood that this type of function can be carried out differently.

More generally, the control module M is able to automatically modify the configuration of the switching device 17, so as to:

stop the supply of current to switch contact zones 9 still in the operational state to the inactive state without the state of use determined by the detection means 16 corresponding to the state of charge to be maintained, and selectively supply current to the contact zones 9 hitherto maintained in the inactive state and for which the state of use determined by the detection means corresponds to the ready-to-charge state.

It is understood that the control module M allows the right quantity of energy to be distributed to the support device 8 at the right time. It is this control module M that contains the intelligence of the system 1. As clearly visible in FIG. 4, this control module M is connected to the support device 8 at one end (output interface of the module M) and to a current plug at the other end (electrical power supply input).

In the nonlimiting example represented, it is possible to maintain the elements 80 in an inactive state and to switch on one of these elements 80 only for a very short instant, of the order of a millisecond. The system 1 is therefore very standby-efficient. In activity, the batteries of the devices 4 are linked to the contact zones 9 formed by the elements 80 via an electrical conduction contact, which makes it possible to have performance levels very close to the conventional charger but with the possibility of simultaneously recharging a wide variety of devices 4.

Obviously, the mode of activation of the elements 80 can change according to requirements. The detection means 16 can thus be configured otherwise, in particular (and in a nonlimiting manner) if the support device 8 comprises a small number of contact zones 9. A detection without forming groups of elements 80 can for example be implemented. For that, it is for example sufficient to use several modules (for example processors) each capable of independently ensuring the tests of each element 80, each having its own process.

Although the examples of FIGS. 2 and 4 show contact zones 9 of square format, a hexagonal form or other forms can be used with the same kind of distribution and the same narrowness of the insulation spacings 10. In variants, the contact zones 9 are arranged staggered and/or comprise at least two distinct types of format.

For a substantially square format of the contact zones 9, at least in one of the rows, the predetermined distance c which separates the two input terminals B1, B2 can satisfy the following relationship in relation to a of the contact zones:

$$1.42 \leq c/a \leq 2.10.$$

In fact, there is no need in practice for the distance $\underline{c}$, defined by the strip B between the input terminals B1 and B2, to be too long in relation to a characteristic size of the contact zones 9. Here it is a question of a good trade-off that nevertheless allows the terminals B1, B2 to not come into contact with the same contact square.

Adapter

Whereas the electricity distribution system 1 can have a variety of options for the stationary part 2, an adapter 3 is provided according to the invention whose geometry is particularly suited to equipping a roaming device 4 which has a recharging port, for example a port of micro-USB or similar type.

Figure 3A:
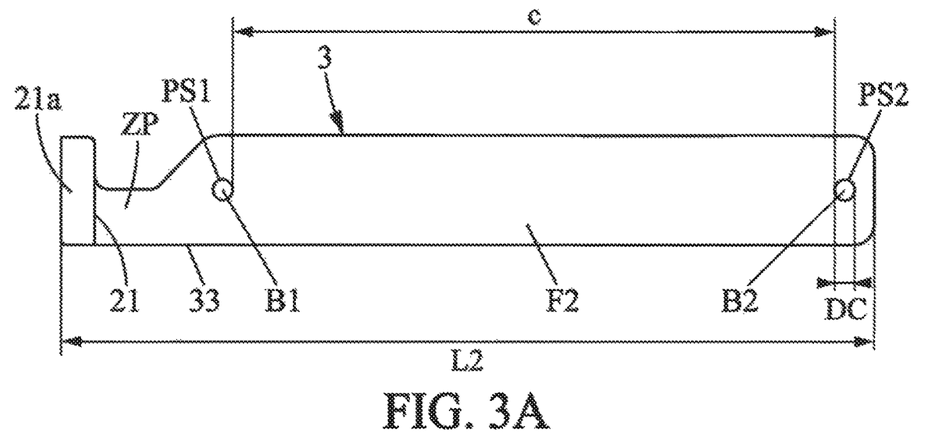
FIG. 3A is a bottom view showing the outer face of the strip of the adapter according to an embodiment conforming to the invention.
Figure 3B:
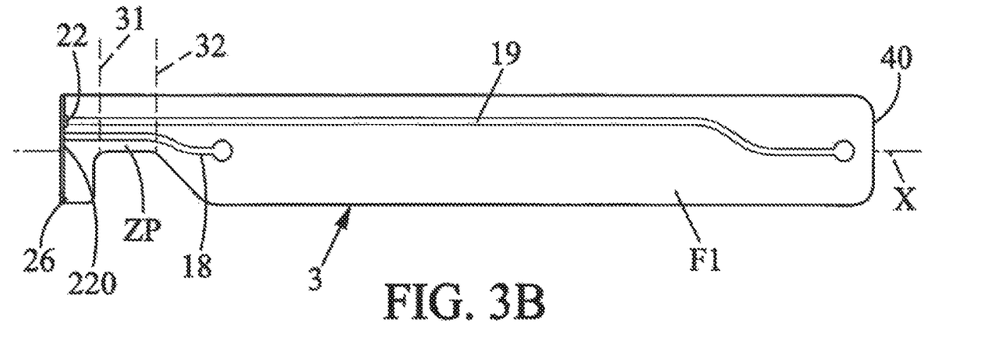
FIG. 3B is a plan view showing the inner face of the strip of the adapter illustrated in FIG. 3A.

Referring to FIGS. 1 and 3A-3B, the adapter 3 has an elongate tongue or tag format by virtue of the strip B. The strip B is thin and prolonged longitudinally by a thicker connector member 20. Preferably, the strip B is flexible and has an optionally constant thickness which does not exceed 2 mm (the thickness being typically greater than 0.001 mm).

The length of the strip B is typically shorter than or equal to the device 4 recharged. In practice, given the usual screen sizes (at least 3 inches or 7.62 cm) for roaming devices, the strip B has an apparent length L2 (visible in FIGS. 3A and 3B) which can typically lie between 50 and 120 mm. The predetermined distance c can thus lie between 40 and 100 mm in preferred embodiments. A greater strip length B can be provided, particularly if it is possible to fold an end of the strip B.

The strip B can comprise several layers, at least three layers in a preferred option. The bottom layer here is flat and covered with an adhesive material (for example repositionable glue of a kind that is known per se or sucker-effect elements) allowing the strip B to be fixed to the device 4. The adhesive material can be chosen to provide a removable adhesion that is repeatable ten or so times with no loss of adhesion. The top layer of the strip B defines the outer face F2 and can allow information, and if necessary one or more logos, to be displayed.

The bottom layer defines the bottom face F1 which is optionally transparent or translucent, as can be seen in FIG. 3B. The inner face F1 is at least partly adhesive and forms a flat attachment surface, such that the strip B forms a sticker which extends in a longitudinal direction between a distal end 40 and a proximal end, bent and close to the recharging port in a state of the adapter 3 assembled on the device 4 to be recharged. The input terminal B2 is here close to the distal end 40, being for example situated at less than 20 or 30 mm, preferably less than 12 mm, from the free edge defined by the distal end 40.

The intermediate layer comprises two electrically conductive bands or lines 18, 19, each linked by one end to one of the conductive input terminals B1, B2 of the adapter 3, and at the other end to the connector elements 22 ("VBUS" and "GND") of the connector member 20. The latter is here produced in the form of a micro-USB male plug if the device 4 is recharged by micro-USB. The connection elements 22 are mounted in the strip B in a bent part 21 of the strip B. It can be noted that these connection elements 22 (defining the connection surface 220) can be situated on the side of the inner face F1, unlike the input terminals B1 and B2 situated on the side of the outer face F2.

Although this example shows a strip B which is assembled with the connector member 21, if necessary by a removable fixing, it is possible, as a variant, to provide for the connector member 21 to be inseparable from the strip B and formed of a single piece with the strip B to define the adapter 3.

Figure 6:
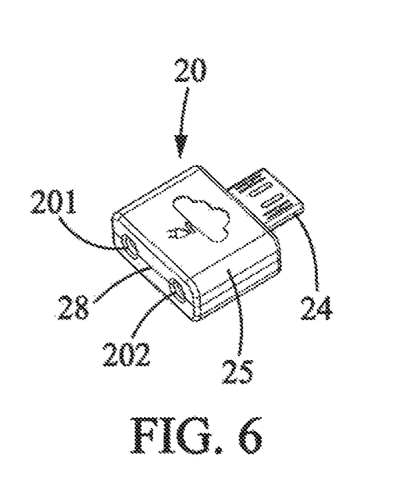
FIG. 6 is a perspective view of a connector member which forms part of the adapter illustrated in FIG. 1.

Referring to FIG. 6, the insertion part 24 of the connector member 20 allows a rigid fixing, typically on a side of the device 4 (position generally adopted in the electronic devices which have a display screen and certain other electrical devices). The connector member 20 also has a head 25, here delimited externally by a housing, which forms a support for the thinner insertion part 24. The connector member 20 serves as intermediary for transmission of electrical current between the device 4 to be recharged and the two electrically conductive bands 18, 19 of the strip B.

To ensure that the current is sent in the right direction, the adapter 3 can include a component which allows only a single direction of circulation of the current between the two terminals B1, B2, in the closed state of the recharging circuit. Even though the latest generation telephones are generally equipped with a protection mechanism of a kind that is known per se preventing a connection which would reverse the polarity of the batteries (the device would not recharge in such a case), this type of component, such as a diode for operation in a single direction makes it possible to ensure the right direction of the current, such that the device 4 charges each time even if it is a device with no protection mechanism. As an example, such a component can be incorporated in the connector member 20. Moreover, a voltage stabilizer can also be incorporated, to ensure an optimal voltage on all the devices 4.

In one embodiment, the conductive bands 18, 19 are composed of metal materials. The input terminals B1 and B2 are typically made of the same material and/or include a coating with high electrical conductivity (copper, silver, certain alloys such as silver-cadmium, alloy of copper and/or gold can thus be suitable without this list being exhaustive).

The bottom and top layers are composed of flexible and non-conductive materials, for example paper or a flexible polymer. Thus, apart from the two input terminals B1, B2, the outer face F2 consists of an electrically insulating coating. It will thus be understood that more than 90 or 95% of the outer face F2 consists of an electrically insulating coating.

Obviously, the system 1 can comprise a plurality of adapters 3, which are preferably identical. As illustrated in the drawings, each adapter 3 can have a number of input terminals B1, B2 exactly equal to two and forming two surface portions PS1, PS2 spaced apart from one another by the predetermined distance c and which form part of the outer face F2.

As is clearly visible in FIG. 2, the predetermined distance c is at least three times greater than the greatest extension of either of the two surface portions PS1, PS2 shown in FIG. 3A. For portions PS1, PS2 of circular or substantially circular section having a diameter DC, the distance c can typically be of a greater order of magnitude (for example being approximately 10 to 100 times greater than the diameter DC or maximum equivalent extension when the portions PS1, PS2 are not circular). The bent part 21 can comprise a predefined fold line 26 formed at the end of the strip B which is rigidly assembled with the connector member 20 and a width restriction zone ZP that can be deformed and folded and which facilitates the form of one or two additional fold lines 31, 32, as can be seen in FIGS. 1 and 3B.

The restriction zone ZP can thus extend transversely to the longitudinal direction of the strip B when the latter is attached by its inner face F1 to a flat back face 6 of a device 4. The central axis X visible in FIG. 3B can define such a longitudinal direction. In a nonlimiting manner, the restriction zone ZP extends here essentially on one side in relation to the central axis X, which makes it possible to form a substantially straight long edge 33. Such a long edge 33 makes it easier for the user to attach the inner face F1 along the longitudinal direction of the central axis X, which in practice avoids the creation of twisting of the width restriction zone ZP.

The strip B shown in FIGS. 3A-3B, before mounting on a device 4, can be flat and it is the junction with the bent part 21 which forms the predefined fold line 26. Alternatively, at least one other fold line 31 and/or 32, parallel to the fold line 26, can be formed before a first mounting on a device 4 to be recharged.

The zone ZP which corresponds to a narrowing is optional and can have a form different from the case illustrated in FIGS. 1 and 3A-3B. Moreover, the number of terminals on the strip B can vary according to need. Thus, the strip B can have more than two contact terminals B1, B2, for example if there is a desire to recharge laptop computers whose battery has a high capacity (for example with a much higher number of cells compared to a telephone battery).

For a recharge of more powerful devices, the adapter 3 can optionally combine several conductive bands or lines 18, 19 in a same strip B having greater dimensions. In this case, a greater number of contact zones 9 supply the same strip B which is perceived by the support device 8 as representing several strips. Thus, an adapter provided with a strip B which has more than one pair of contact terminals can be perfectly suitable for allowing a relatively powerful device 4 to be recharged.

The output terminals of the strip B, formed by the connection elements 22, protrude from an inner face of the strip B and are oriented in a direction substantially at right angles to the orientation of the two input terminals B1, B2, such that the strip B makes it possible to retain a flat configuration of the outer face F2 when the adapter 3 is attached to a back face 6 of a device 4 and connected to a recharging port of this same device 4 by the connector member 20.

Figure 7:
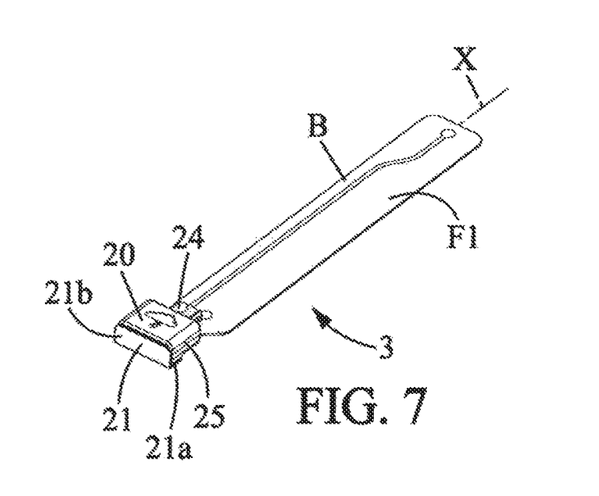
FIG. 7 is a perspective view of the adapter illustrated in FIG. 1.

Referring to FIG. 7, the head 25 of the connector member 20 can be rigid and is prolonged by an insertable removable connection part 24, for example of micro-USB type. The terminals 201, 202 formed in the head 25 are arranged at the bottom of cavities which correspond to the protuberances formed by the connection elements 22 in the bent part 21. This bent part 21, which is rigid and which can include an L-shaped section made of ferromagnetic material, covers the rear face 28 of the connector member 20.

The ferromagnetic material present in the bent part 21 here complements the connection elements 22 to define attachment means which allow the strip B to be detached. Magnets can optionally be provided (here on the side of the connector member 20), such that the strip B is removably fixed to the connector member 20. This arrangement also allows the strip B to be positioned selectively on one side (according to a first configuration) or on another opposite side (according to a second configuration). It is thus possible to take off the strip B to turn it over and reattach it, for example by magnetization.

When the bent part 21 forms an L, the covering section 21*b* which covers the rear face 28 is flat, rigid, and at right angles to the central axis X or other longitudinal direction defined by the rest of the strip B. The other section 21*a*, adjacent to the narrower and flexible restriction zone ZP, can have substantially the same width as the covering section 21*b* and preferably has a rigidity similar or identical to that of the covering section 21*b*.

The bent part 21 is advantageously connected to the head 25 opposite the insertable part 24, which facilitates the miniaturization of the head 25. The strip B comprises a position adjustment portion which corresponds to the width restriction zone ZP, this adjustment portion being able to be delimited between the first fold line 31 of the strip B which is proximal in relation to the connector member 21 and the second fold line 32 which is distal. The adjustment portion allows the bent part 21 to be offset in relation to the flat attachment zone defined by the inner face F1. The longitudinal dimension of the zone ZP defined by the adjustment portion can be of the order of 5 to 15 or 20 mm (dimension measured along the central axis X before folding).

Although the figures show an adapter 3 on its own connected to the device 4, it is, as a variant, possible to connect an accessory to the adapter 3. Thus, when the device 4 is equipped with interchangeable shells (which allows personalization), the adapter 3 can:

either cover the shell by its inner face F1 (case where the face 6 can be defined by a shell secured to the adapter 3), or be partly incorporated in a shell which complements the device 4 (case of a shell which is removable with the adapter 3).

More generally, it is possible to extend the strip B and/or the connector member 20 to produce additional functions. At least one end of the adapter 3, remote from the contact zone where the terminals B1, B2 are situated, can thus comprise a complementary element which covers or extends in proximity to another face of the device 4.

Installation of the Adapter and Recharging

Referring to FIGS. 1 and 6-7, the process of installation of the adapter 3 on the device 4 by the user is as follows: the user first of all connects the insertable part 24, here a micro-USB male plug in the example of FIG. 6 (or other if the device 4 is not recharged by micro-USB), in the socket forming the recharging port of his or her device 4, then turns down the flexible strip B on the back thereof (FIGS. 1 and 7 showing a conformation of the adapter 3 which is well suited for the strip B to be fixed in the manner of a label or sticker).

Referring to FIG. 1, the strip B is glued by its inner face F1 onto the back face 6 of the device 4 by virtue of the adhesive of the bottom layer. In the installed state, the input terminals B1 and B2 are arranged in a same plane, on the outer face F2 with an alignment which can be substantially parallel to the central axis X or similar longitudinal direction.

Referring to FIG. 4, once the adapter 3 is thus installed on the device 4, the user can recharge it by placing it on the recharging surface 5 with the face of use (face with screen and/or with user interface) uppermost, which allows the outer face F2 of the strip B to be positioned downward. The two conductive input terminals B1, B2, which are here two metal circles of small dimension (between 0.001 mm and 5 mm for example), are each placed on a different contact zone 9. The contact zones 9 here have the form of a square but the cutout of the elements 80 can obviously be different.

Referring to FIG. 4, each support device 8 is configured, normally, such that the recharging surface 5 is linked to the ground. It is typically the ground of the circuit which is itself linked to the mains ground. It is possible to provide a controlled switch or similar switching device, for example positioned on the printed circuit of the control module M, which allows each cutout element 80 to be connected to the necessary voltage independently of the other elements 80.

Following a time interval, the switch briefly connects the element 80 to the nominal voltage. The equivalent resistance between this element 80 and the ground is then measured. If the latter corresponds to the predicted device 4, then the voltage continues to be sent. A cyclical measurement of the equivalent resistance begins. Upon the first measurement or cyclical measurements after a first verified test, if the equivalent resistance no longer corresponds to that of the predicted device 4, then the switch is reset to the ground. This solution makes it possible to ensure that, as soon as a device to be recharged 4 is placed on the recharging surface, the right contact zone 9 of an element 80 switches to the high potential.

By default, the control module M checks that all the elements 80 remain at the low potential. Only the adapter 3 installed on a device to be recharged 4 can activate the energy distribution. The ADC converters take care of performing the measurement while a microcontroller or similar processing unit 15 processes these measurements and does the driving.

When the control module M has identified the presence of the assembly formed by the adapter 3 and the device 4 on the recharging surface 5 and identified the correct contact zones 9, it commands the switching device 17 to deliver the current needed to recharge the device 4. Only the two contact zones 9 which are in contact with the input terminals B1, B2 are switched on, after a check by the processing unit 15 that the state of these contact zones 9 corresponds to the "ready-to-charge" state.

The passage of current between the contact zones 9 of the recharging surface 5 and the two conductive input terminals B1, B2 of the adapter 3 is done by contact, with high energy efficiency.

In one embodiment, the tester elements which allow the detection of the state of operation of the elements 80 forming the contact zones 9 are configured to periodically and very briefly check such a state. The tester elements are for example electrical signal converters. It will be understood that the control module M allows the state of the elements 80 to be modified automatically to avoid any unnecessary energy expenditure and recharge a device 4 which comes to be placed on the recharging surface 5, without a step of identification regarding the nature or specific characteristics of the device 4.

The relative position of the back face 6 of the devices 4 in relation to the recharging surface 5 is immaterial to allow the recharging, provided that the terminals B1, B2 are well positioned on one of the contact zones 9.

The separation distance D10 between the contact zones 9 is here slightly greater than the diameter DC of the surface portions PS1, PS2 so as to prevent the input terminals B1, B2 from being able to be in contact with two contact zones 9.

One of the advantages of the electricity distribution system 1 is its adaptation to a very great number of users (any person having at least one roaming electrical or electronic device 4) and to any sort of environment (home or in public places offering access to the recharging surface), with the possibility of freely distributing or marketing the adapter independently for the company or organization wanting to provide target users with such a possibility of recharging their roaming devices 4 in their premises or in public spaces. The space available on the outer face F2 makes it possible for the strip B to act as a label, such that the adapter 3 can be used for visual communication around the logo, a text or other communication elements.

Once the user has an adapter 3, he or she can use any corresponding recharging surface 5 to recharge his or her roaming electrical or electronic device 4. Other advantages that can be cited include:

the facility to recharge several devices 4 on the same recharging surface 5, by preferably providing the optimal energy from a single electrical plug 12;

the reduced weight of the adapter 3 which is typically very much less than 10 g by virtue of the thinness of the strip B (whose thickness can be substantially constant with the possible exception of the bent part, and for example less than or equal to 2 mm); and the low energy cost by virtue of a control of the supply of power to the content zones 9 (same recharging efficiency as a conventional charger, no energy losses when charging and on standby).

The system 1 can be incorporated in furniture or suitable supports. If necessary, a holding device can be used to allow a recharging of devices 4 on sloped or vertical flat recharging surfaces 5. The device 4 to be recharged is stuck against the recharging surface 5 by virtue of a position holding element and/or by virtue of an elastic return element (for example a spring member) which tends to press the device 4 against the recharging surface. The strip B can if necessary be linked, by its end opposite the connector member 20 or by another part, to an attachment member. According to an option, the device 4 can be suspended on a wall or a piece of furniture, when the adapter 3 is linked with the support device 8 to be recharged and/or powered.

The devices to be recharged 4 are not limited to telephones and other roaming communication devices. Digital photography devices, PDAs (personal digital assistants), laptop computers, digital headsets, wireless mice, robots, chargers or toys having batteries, provided that they have a relatively flat surface or suitable support surface close to a recharging port, are also suitable for being recharged by the electricity distribution system 1, using the embedded adapter 3. It will thus be understood that the recharging surface 5 can be suitable for powering and/or recharging:

small domestic electrical devices equipped with the adapter 3, and so-called "connected things": watches, bracelets, sensors, fabrics (existing and future things).

It should be obvious to persons skilled in the art that the present invention allows embodiments in numerous other specific forms without departing from the scope of the invention as claimed. Thus, the strip B or tongue is not necessary of a single piece and can, in variants, be broken down into several pieces assembled together by using any appropriate fixing method, snap-fitting corresponding to a preferred (but nonlimiting) option.

The relative position of the strip B in relation to the device 4 can be different, for example by using a foldable or specifically articulated part (optionally being able to form a foot allowing the device 4 to be placed at an angle of the order of 90° or less (for example 60°) relative to the horizontal (in the manner of a photo frame). A position different from the flat position can thus be obtained, with the advantage of favoring video viewing comfort for example.

The adapter 3 can also be prolonged by a case or a housing fulfilling an accessory storage function, for example for earpieces. Optionally, the strip B and/or the connector member 20 can be assembled in such a container. In this case, the container can for example include the connector member 20 and extend away from the terminals B1, B2, with a bulk suitable for not interfering with the recharging contacts between the strip B and the recharging surface 5.

Although the figures illustrate the case of a substantially flat face 6 for attaching the strip B, it will be understood that the strip B can be stuck differently along a face of the device 4. For example, the outer face F2 of the strip B can be housed, at least partly, in an indent formed on a face of the device 4 to be recharged (which may make it possible to partly tuck in the strip B; in such a case, the thickness of the strip B is not added necessarily to the thickness of the device 4).

The invention claimed is:

1. An electricity distribution system for making it possible to recharge and/or power, in succession or simultaneously, roaming electrical or electronic devices provided with stand-alone power supply means, the system comprising:

a support device which has a substantially flat recharging surface defined essentially by:

a plurality of conductive contact zones distributed according to two directions forming adjacent rows, insulation spacings between the contact zones, a control module for selectively supplying the contact zones with current; and at least one adapter with two electrically conductive input terminals forming two surface portions spaced apart from one another by a predetermined distance and adapted to cooperate by direct conduction contact with two contact zones of the recharging surface;

wherein the at least one adapter comprises a strip including the two input terminals and which has:

a substantially flat outer surface comprising or defining an electrically insulating coating, the two surface portions forming part of the outer face, the outer face being dimensioned and configured for the predetermined distance to be at least three times greater than the greatest extension of either one of the two surface portions;

an inner face opposite the outer face and adapted to come to be attached against a face of a roaming electrical or electronic device; and a bent part offset relative to the inner face and linked electrically to the two surface portions.

2. The electricity distribution system as claimed in claim 1, wherein the inner face is at least partly adhesive and forms a flat attachment surface, such that the strip forms a sticker which extends along a longitudinal line between the bent part and a distal end.

3. The electricity distribution system as claimed in claim 1, comprising a group of several adapters each provided with a corresponding strip, such that the system is adapted to simultaneously recharge several roaming electrical or electronic devices equipped with a respective adapter of said group.

4. The electricity distribution system as claimed in claim 1, wherein the adapter comprises a connector member provided with an insertable removable connection part forming a first end of the connector member and a head which forms a second end of the connector opposite the insertable part, the bent part comprising a connection surface allowing the head of the connector member to be linked to the strip.

5. The electricity distribution system as claimed in claim 3, wherein the strip is elongate and has a length at least two times greater than its greatest width, the strip allowing the connection surface to be longitudinally and radially distanced from the flat attachment surface, at least in an installed state of the adapter on a device to be recharged.

6. The electricity distribution system as claimed in claim 1, wherein the contact zones of a determined row chosen from said rows each have a same perimeter which is greater than a length of a set formed by three successive contact zones which belong to the determined row, the predetermined distance having a length exceeding a quarter of said perimeter and which is sufficiently greater for the two input terminals not to be able to be located on a same contact zone of the recharging surface.

7. The electricity distribution system as claimed in claim 6, wherein the predetermined distance is less than half of said perimeter.

8. The electricity distribution system as claimed in claim 1, wherein in several of said rows:
the contact zones have a same substantially square or hexagonal format, with a same side, so as to each define a same surface.

9. The electricity distribution system as claimed in claim 8, wherein the two surface portions, which are of the same outer form and of the same dimensions, are each smaller and of a different order of magnitude than the surface defined by the contact zones.

10. The electricity distribution system as claimed in claim 8, wherein the format of the contact zones is square in at least one of the rows and the predetermined distance which separates the two input terminals satisfies the following relationship in relation to the side of the contact zones:

$$1.42 \leq c/a \leq 2.10.$$

11. The electricity distribution system as claimed in claim 1, wherein the contact zones are arranged in staggered fashion and/or comprise at least two distinct types of format.

12. An adapter for roaming electrical or electronic devices, provided with two electrically conductive input terminals forming two surface portions spaced apart from one another by a predetermined distance and adapted to cooperate by direct conduction contact with a recharging surface, wherein said adapter is used in an electricity distribution system and said adapter comprising a strip which includes the two input terminals and which has:
a substantially flat outer face comprising or defining an electrically insulating coating, the two surface portions forming part of the outer face, the outer face (being dimensioned and configured for the predetermined distance to be at least three times greater than the greatest extension of either one of the two surface portions;
an inner face opposite the outer face and adapted to come to be attached against a face of a roaming electrical or electronic device; and
a bent part offset in relation to the inner face and linked electrically to the two surface portions.

13. The adapter as claimed in claim 12, comprising a connector member provided with a rigid head and which has an insertable removable connection part distinct from said head, the bent part being connected to the head of the connector member and having a position adjustment portion delimited between a first fold line of the proximal strip in relation to the connector member and a second fold line of the distal strip relative to the connector member.

14. The adapter as claimed in claim 12, wherein the bent part of the strip has attachment means for removably fixing the strip to the connector member, selectively according to a first configuration or a second configuration distinct from the first configuration.

15. An electricity distribution method for recharging and/or powering, in succession or simultaneously, several roaming electrical or electronic devices provided with stand-alone power supply means, by using a substantially flat recharging surface which has a plurality of conductive contact zones distributed according to two directions forming adjacent rows, wherein the method comprises, for each device to be recharged:
connecting an adapter to a recharging port of the device via a connector member with removable connection, on the side of an edge of the device, the adapter comprising a strip which extends the connector member and which is provided on an outer face with two electrically conductive input terminals forming two surface portions;
sticking and attaching, in an attachment zone, an inner face of the strip opposite the outer face against a face of the device, while keeping the connector member separated from the attachment zone and in a state of electrical link to a part of the strip which is bent;
placing the adapter between the device and the recharging surface by placing the two surface portions in direct conduction contact on distinct contact zones of the recharging surface, given that the two surface portions are spaced apart from one another by a predetermined distance at least three times greater than the greatest extension of either one of the two surface portions; and
selectively supplying contact zones with current, such that the two contact zones on which the two surface portions bear are in an operation state and allow the recharging via the adapter.

* * * * *